Figure 1:
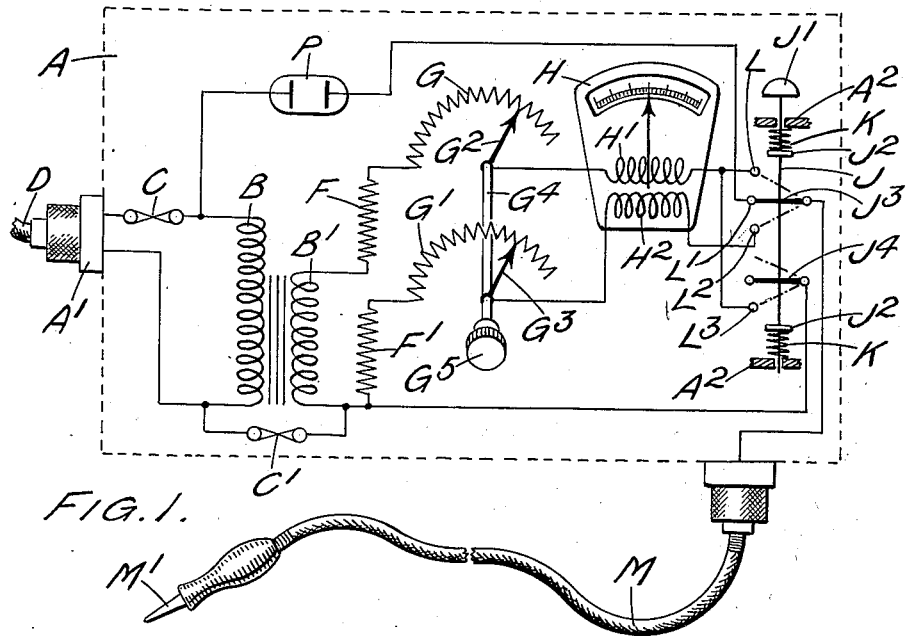

Sept. 27, 1938. H. LEYBURN ET AL 2,131,517
EARTHING ARRANGEMENT FOR ELECTRIC APPARATUS
Filed May 4, 1936 2 Sheets-Sheet 1

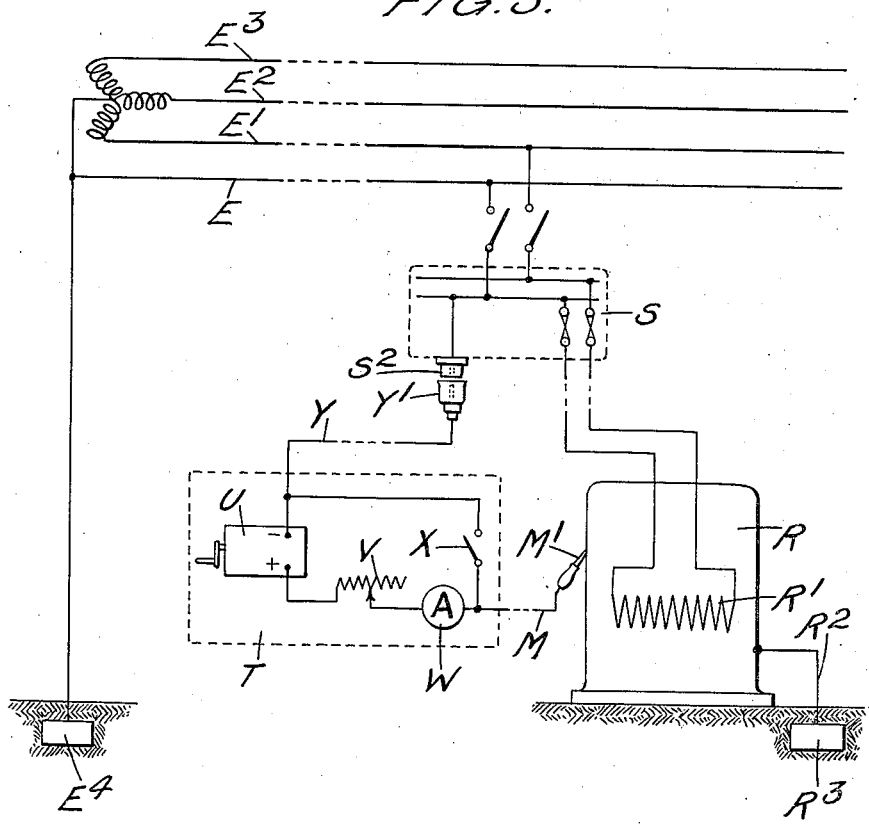

Patented Sept. 27, 1938

2,131,517

UNITED STATES PATENT OFFICE 2,131,517

EARTHING ARRANGEMENT FOR ELECTRIC APPARATUS

Henry Leyburn, Newcastle-upon-Tyne, and Clemett Harrison Wragge Lackey, Chester-Le-Street, England, assignors to A. Reyrolle & Company Limited, Hebburn-on-Tyne, England, a company of Great Britain Application May 4, 1936, Serial No. 77,888 In Great Britain May 15, 1935

17 Claims. (Cl. 175—183)

The present invention relates to earthing arrangements for electric apparatus and is more particularly concerned with such arrangements of the kind, usually known as the "solid-earth" type, in which the frame or other metal-clad portion of the apparatus is directly connected to earth, that is, is connected to an earth plate or earthing device by a direct low electrical resistance connection which does not include any coil or other device tending to increase its resistance or impedance. The invention is particularly suitable for use with consumer's apparatus in low voltage supply systems although it is also applicable to other apparatus such, for example, as high voltage metal-clad switchgear.

In apparatus having an earthing arrangement of this kind the low resistance earth connection prevents the frame reaching a dangerous potential when there is an earth fault in the apparatus and when the apparatus is supplied from a system having a low resistance main earth at the supply station or at any other convenient point, allows sufficient earth fault current to flow for melting overload fuses in the supply circuit to the apparatus or for causing the operation of an overload tripping device for isolating the defective apparatus.

In order that such an earthing arrangement may be effective on the occurrence of an earth fault in the apparatus, it is essential that the connection between the apparatus and the earthing device should be unbroken and that the resistance of this connection and of the earthing device should remain low. In practice the apparatus will usually continue to function satisfactorily irrespective of whether or not the earth connection is sound, and it is not until an earth fault actually occurs that dangerous conditions may arise due to an incomplete or inefficient earth connection which has been neglected.

The continuity of the direct earth connection may be tested by connecting a source of E. M. F., in series with an indicating device such as an ammeter, between the frame of the apparatus and the neutral conductor of the supply system so that a current flows through the neutral conductor, the main earth of the supply system and the direct earth connection of the apparatus to cause operation of the device.

With this arrangement a rough measurement of the resistance of the earth circuit is obtained as the current flowing through the testing circuit (that is from the source of E. M. F. through the ammeter, the connection to the apparatus frame, the apparatus earth connection and earthing device, earth and back through the main earth of the supply system and the neutral conductor to the source of E. M. F.) depends, inter alia, on the resistance of the apparatus earthing device and connection. Whilst this measurement is usually adequate for testing the continuity of the earth circuit, it cannot be relied upon when it is desired to obtain an accurate measurement of the ohmic resistance of this circuit. For instance the potential of the neutral conductor at a consumer's premises where the test is made (whether it is the neutral conductor of a polyphase A. C. system or the mid-wire of a D. C. system), will differ from that of earth when there is an unsymmetrical load on the system and, as will be appreciated, any voltage between the neutral conductor and earth at the point on the system where the test is made, will constitute an E. M. F. in the testing circuit additional to that of the source of E. M. F. referred to above, and will modify the current flowing through the ammeter.

The main object of the present invention is to provide an improved testing arrangement employing an ammeter or other measuring instrument whereby greater accuracy in the measurement of the ohmic resistance of the apparatus earth circuit can be obtained.

According to the present invention calibration means are associated with the measuring instrument whereby a measurement substantially independent of any difference of potential between the neutral conductor and earth is obtained. Thus prior to actuation of a testing switch or other control means, an electrical characteristic of the series circuit, for example its resistance, may be varied or "calibrated" in accordance with the potential of the neutral conductor with respect to earth. Preferably calibration is effected by connecting the measuring instrument to the source of E. M. F. in series with an adjustable resistance and causing a current dependent on the potential of the neutral conductor to influence the deflection of the instrument, the adjustable resistance then being varied to produce a predetermined deflection.

When the source of E. M. F. comprises a battery or other D. C. source, or an A. C. source having a frequency different from that of the supply frequency, the measuring instrument may be calibrated in the manner described above or means, such as a tuned rejector circuit or a choking impedance or the equivalent, may be so associated with the instrument as to prevent it being influenced by an A. C. of the frequency of the supply system.

A further source of possible error in the instrument reading is introduced when the source of E. M. F. is derived from the supply system, for example by means of a transformer, potential divider or equivalent arrangement, since variations in the supply voltage even within the relatively small statutory limits, will appreciably affect the accuracy of the measurements obtained. According to a further feature of this invention means are provided for compensating for variations in the supply voltage, such means preferably comprising a variable resistance and/or reactance, connected in series with the ammeter or other measuring instrument and adjusted prior to testing to compensate for a deviation of the supply voltage from its normal value.

Figure 2:
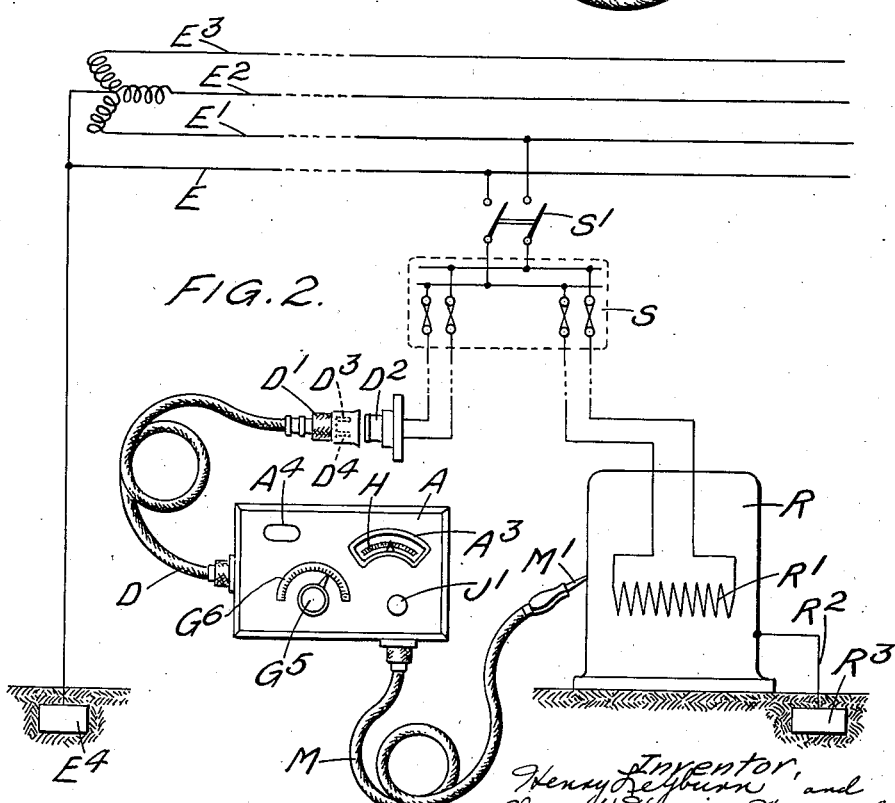

The following is a description by way of example of two convenient forms of portable earth testing equipment according to this invention, with reference to the accompanying drawings, in which Figure 1 is a wiring diagram of one equipment, Figure 2 shows, somewhat diagrammatically, the equipment shown in Figure 1 as used for testing the continuity and measuring the resistance of the direct earth circuit of single-phase electric apparatus connected between one phase and the neutral conductor of three-phase A. C. supply mains, and Figure 3 shows, also diagrammatically, the other equipment as used for a test similar to that shown in Figure 2.

The equipment shown in Figures 1 and 2 is mounted in a box or casing A so as to be readily portable, and comprises a small testing transformer having its primary winding B connected through a fuse C to a terminal box $A^1$ to which is connected a flexible conductor D provided at its end with a two-pin plug $D^1$ (Figure 2). This plug is adapted to be inserted in any convenient socket $D^2$ having its contacts connected to the neutral conductor E and one line $E^1$ of the A. C. supply system of the apparatus to be tested, in this case a three-phase supply system $E^1$, $E^2$, $E^3$ (Figure 2). The step-down voltage of the testing transformer is preferably such that the potential which is supplied to the frame of apparatus to be tested is below a value which is likely to be dangerous to human beings or live stock.

One side of the secondary winding $B^1$ of the testing transformer is connected through a fuse $C^1$ and the flexible conductor D to the pin $D^3$ (Figure 2) of the plug $D^1$ which is to be connected to the neutral conductor of the supply system and the other side of the winding $B^1$ is connected, in series with a limiting resistance F and an adjustable calibrating resistance G, to one side of the main coil $H^1$ of an A. C. ammeter H.

The equipment is provided with a push button switch J of the three-position type, arranged so that its operating knob $J^1$ projects through the top of the casing. This switch has a raised "testing" position, an intermediate normal position, in which it is shown in Figure 1, and a depressed "calibrating" position, and is provided with springs K arranged between stops $J^2$ on the switch-operating rod and fixed stops $A^2$ on the casing A, these springs serving to return the switch automatically to its normal position when it is released. The switch J has a main three-position switch arm $J^3$ which engages with upper, intermediate and lower fixed contacts L, $L^1$, $L^2$ respectively in the three positions of the switch. It is also provided with an auxiliary contact arm $J^4$ operated simultaneously with the main arm and arranged to engage a cooperating contact $L^3$ only when the switch is in the calibrating position. The main arm $J^3$ of the switch is connected to a flexible cable M having at its end a bared pin or "wander plug" $M^1$ by means of which connection can readily be made to the frame of apparatus under test. The auxiliary arm $J^4$ of the switch is connected to that side of the secondary winding $B^1$ of the transformer which is connected to the fuse $C^1$. The other side of the main coil $H^1$ of the ammeter H is connected to the upper and auxiliary contacts L and $L^3$ of the switch.

The ammeter H is provided with a second or auxiliary coil $H^2$ which bears a predetermined relation to the main coil $H^1$ and has one side connected to the neutral conductor E of the supply system through a circuit including auxiliary limiting and calibrating resistances $F^1$ and $G^1$, the fuse $C^1$, the flexible conductor D and the pin $D^3$ of the plug $D^1$. The other side of the coil $H^2$ is connected to the contact $L^2$ of the switch J. The adjusting members $G^2$ and $G^3$ of the two calibrating resistances G and $G^1$ are mounted on a common spindle $G^4$ (or are otherwise "ganged") so that they are operated simultaneously, the spindle being arranged to project through the top of the casing A. The projecting end of the spindle $G^4$ is provided with an operating knob $G^5$ having a pointer which cooperates with a scale $G^6$ (Figure 2) on the cover of the casing. A neon or other indicating lamp P is connected in series between the contact $L^1$ of the switch and the pin $D^4$ of the plug $D^1$ which is to be connected to the line conductor $E^1$ of the supply system. The casing A in which the whole equipment is mounted is, as shown in Figure 2, provided with windows $A^3$ and $A^4$ through which the ammeter and neon lamp can be observed.

In using the equipment, the plug $D^1$ is inserted in a socket $D^2$ near the apparatus to be tested which, as shown in Figure 2, may consist of a motor having a metal frame R and a winding $R^1$ connected, through fuses on a distribution board S, and a main switch $S^1$, to the line $E^1$ and the neutral conductor E of the three-phase supply system $E^1$, $E^2$, $E^3$. The frame R of the motor has a direct earth connection through a conductor $R^2$ to an earth plate $R^3$. The neutral point of a star-connected transformer (of which only the secondary winding is shown) for supplying the three-phase mains, is earthed at $E^4$.

If a socket, such as the socket $D^2$, is not available in the neighbourhood of the apparatus to be tested, the plug $D^1$ may be provided with a suitable adapter so that connection may be made to a convenient lamp holder. The plug $D^1$ is inserted in the socket $D^2$, or is otherwise connected to the supply mains, with the switch $J^1$ in its normal position and, as soon as this connection is made, the frame R of the apparatus under test is touched with the wander plug $M^1$. If the neon lamp P lights it is an indication that the polarity is correct, whilst if this lamp does not light, the plug $D^1$ must be reversed in the socket.

When the polarity indicating lamp P is alight the switch $J^1$ is depressed to the lower or calibrating position, thereby completing two circuits. The first of these circuits extends from one side of the transformer winding $B^1$ through the main limiting and calibrating resistances F and G, the main coil $H^1$ of the ammeter, contact $L^3$ and arm $J^4$ of the switch to the other side of the winding $B^1$. The second circuit extends from the neutral pin $D^1$ of the plug through the fuse $C^1$, the auxiliary limiting and calibrating resistances $F^1$ and $G^1$, the auxiliary coil $H^2$ of the ammeter, contact L² and arm J³ of the switch, the flexible conductor M and wander plug M¹, the frame R of the apparatus, the apparatus earth connection and earth plate R² and R³, earth, the main earth plate E⁴ of the supply system, and the neutral conductor E to the pin D¹ of the plug. It is to be noted that the current flowing in the first of these circuits depends on the setting of the main calibrating resistance G and the secondary voltage of the transformer, that is on the voltage of the supply system, whilst the current flowing in the second circuit—if any—is due to the voltage between the neutral conductor E and earth and depends on the value of this voltage and the setting of the auxiliary calibrating resistance G¹. In order to effect calibration the operating spindle G⁴ is actuated to adjust the settings of the calibrating resistances G and G¹ to bring the ammeter pointer into the full scale position.

After calibration in the manner described above for the supply voltage and the potential of the neutral conductor, the switch J¹ is raised to the testing position, thereby opening the circuit of the auxiliary coil H² of the ammeter and completing a circuit from one side of the transformer winding B¹ through the main limiting and calibrating resistances F and G, the main coil H¹ of the ammeter, the contact L and arm J³ of the switch, the flexible conductor M and wander plug M¹, the frame R of the apparatus, the earth connection and earth plate R² and R³, earth, the main earth plate E⁴ of the supply system, the neutral conductor E, the neutral pin D³ of the plug, and the fuse C¹ to the other side of the secondary winding B¹. With the switch in this position the deflection of the ammeter H is observed and the reading obtained is multiplied by a multiplying factor depending upon the settings of the calibrating resistances G and G¹ and shown on the scale G⁶ opposite the end of the pointer on the operating knob G⁵ for these resistances.

Preferably the ammeter dial is marked in ohms so the reading obtained, after correction for the settings of the resistances, gives the true ohmic value of the part of the circuit which, as will be appreciated from the above description, is inserted in series with the main coil H¹ of the ammeter when the switch J is moved from the calibrating to the testing position, that is (neglecting the resistance of the wander plug M¹ and its flexible connection M) the complete earth circuit of the apparatus back to the neutral conductor of the supply system.

It should be mentioned that it is preferable to arrange the two calibrating resistances G, G¹ in such a manner that in every position of adjustment the ratio of the ohmic resistance of the auxiliary calibrating resistance G¹ to that of the main calibrating resistance G is equal to the ratio of the number of turns of the auxiliary coil H² of the ammeter to that of the main coil H¹. This ratio is so chosen that the ohmic resistance of the auxiliary resistance G¹ in the position of adjustment necessary to give full scale deflection on the ammeter H during calibration, is large compared with the actual value of the ohmic resistance of the complete earth circuit of the apparatus, so that the resistance of the earth circuit will not appreciably affect calibration. When this relationship holds, it can be shown by a simple calculation, that the multiplying factor above mentioned (i. e. the factor by which the test reading of the ammeter must be multiplied to give the actual resistance of the earth circuit) assuming the ammeter to be marked with a suitable scale in ohms, is $$\frac{r_1}{r}$$

where $r$ is the ohmic resistance required in series with the main coil H¹ of the ammeter to give full scale deflection with applied normal transformer voltage, and $r_1$ is the ohmic resistance of the main calibrating resistance G which gives full scale deflection during calibration. In fixing the ratio of the main and auxiliary resistances G and G¹ as described above and in calculating the multiplying factor, the ohmic resistance of the limiting resistance (F or F¹) when provided, is included as part of the ohmic resistance of the calibrating resistance (G or G¹) with which it is associated.

Whilst in the above description the various portions of the apparatus have been described as separate members it will be appreciated that they can, if desired, be combined in any convenient manner. For example instead of separate limiting and calibrating resistances there may be an adjustable resistance which has a minimum setting with a predetermined ohmic resistance which is sufficient to limit the current flowing in the circuits concerned when the adjustable portion of the resistance is cut out of circuit. It will also be appreciated that if desired the resistance and/or the switch can be incorporated in the ammeter case so that the whole apparatus is rendered as portable and compact as possible.

Whilst in the arrangement described above the calibration of the ammeter in accordance with the potential of the neutral conductor is effected by means of an auxiliary coil on the ammeter, it will be appreciated that if desired various alternative arrangements can be employed.

In the case of an arrangement employing a D. C. supply such as a battery or a hand-operated generator, as the source of E. M. F., a calibrating circuit generally similar to that described above can be employed for eliminating the effect of any potential on the neutral conductor. As, however, it is frequently desirable, in order that the apparatus may be readily portable, to use a low voltage battery, e. g. 4.5 or 6 volts, whereas the potential between neutral and earth may be as large as 10 volts, it is preferable to employ an ammeter which is unaffected by alternating currents or to provide the ammeter with some form of choking or filtering device which prevents it from being influenced by alternating current due to the neutral potential.

A suitable equipment employing a D. C. source of E. M. F. is shown in Figure 3. As shown in this figure the portable equipment comprises a casing T (indicated in dotted lines) containing a hand-operated generator U having its positive terminal connected, in series with a variable resistance V, to one side of a moving coil ammeter W. The other side of the ammeter is connected to the flexible lead M for the wander plug M¹ which is similar to that of the equipment shown in Figure 1. This side of the ammeter is also connected through a normally open switch X to the negative terminal of the generator U. Another flexible conductor Y having at its end a single-pin plug Y¹, is provided for connecting the negative terminal of the generator to a socket S² connected to the neutral conductor E of the apparatus supply system, this socket conveniently being mounted on the distribution board S. The arrangement of the apparatus R to be tested and its supply system, is described above in connection with the arrangement of Figure 2.

In operating this equipment the plug Y¹ is inserted in its socket and, before touching the apparatus frame with the wander plug M¹, the switch X is closed and the generator operated up to its normal speed. The variable resistance V is then adjusted to the position in which the ammeter W gives a full scale deflection. The switch X is then opened and the apparatus frame R touched with the wander plug M¹. The current passing through the ammeter W will then consist of two currents, namely a direct current which is less than that obtained when the switch is closed by an amount depending upon the resistance of the apparatus earth circuit, and an alternating current depending upon the potential between the neutral conductor and earth. As the ammeter is of the moving coil type it will be unaffected by the alternating current. The ammeter can thus be directly calibrated in ohms and its reading will be unaffected by any variations in the potential between the neutral conductor and earth. If desired the variable resistance V with its associated switch X can be omitted although such a resistance is preferably provided particularly when a battery is used, in order to correct for the state of the battery before making a measurement.

Whilst the above description is concerned mainly with a testing equipment of the portable type, it will be appreciated that the arrangement of the present invention can be incorporated in or added to any desired form of earthing arrangement when it is desired to measure the resistance and/or test the continuity of the earth circuit of electrical apparatus.

It is to be understood that the above description is by way of example only and that modifications may be made within the scope of the invention.

What we claim as our invention and desire to secure by Letters Patent is:—

1. In electric apparatus energized from a supply system with an earthed neutral conductor, and having its frame or other metal-clad portion provided with a direct earth connection, the combination of a source of E. M. F., a measuring instrument having its operating circuit connected in series with the source of E. M. F., means for connecting this series circuit between the frame of the apparatus and the neutral conductor of the supply system and means for varying an electrical characteristic, such as the resistance, of the said series circuit in accordance with the potential of the neutral conductor with respect to earth.

2. In electric apparatus energized from a supply system with an earthed neutral conductor and having its frame or other metal-clad portion provided with a direct earth connection, the combination of a source of E. M. F., a measuring instrument having its operating circuit connected in series with the source of E. M. F., means for connecting this series circuit between the frame of the apparatus and the neutral conductor of the supply system, and calibrating means comprising an adjustable resistance, means for connecting the measuring instrument in series with the adjustable resistance between the neutral conductor and the frame of the apparatus so that a current depending on the potential of the neutral conductor influences the deflection of the instrument, and means for adjusting the resistance to produce a predetermined deflection of the instrument.

3. In electric apparatus energized from a supply system with an earthed neutral conductor and having its frame or other metal-clad portion provided with a direct earth connection, the combination with voltage reducing means connected with the supply system, a measuring instrument having its operating circuit connected in series with the reduced voltage from said means, means for calibrating this series circuit in accordance with variations in the voltage of the supply system, and means for connecting this series circuit between the frame of the apparatus and the neutral conductor of the supply system.

4. In electric apparatus energized from a supply system with an earthed neutral conductor and having its frame or other metal-clad portion provided with a direct earth connection, the combination of a source of E. M. F., a measuring instrument having its operating circuit connected in series with the source of E. M. F., an adjustable resistance connected in series with the instrument to the source of E. M. F., whereby the resistance can be adjusted to compensate for any deviation of the voltage of the source from its normal value, and means for connecting the series circuit comprising the source of E. M. F., the measuring instrument and the adjustable resistance between the frame of the apparatus and the neutral conductor of the supply system.

5. In electric apparatus energized from a supply system with an earthed neutral conductor and having its frame or other metal-clad portion provided with a direct earth connection, the combination of a source of E. M. F., a measuring instrument having main and auxiliary coils, an adjustable resistance, means for connecting the auxiliary coil in series with the adjustable resistance between the apparatus frame and the neutral conductor of the supply system whereby the resistance can be adjusted in accordance with the potential of the neutral conductor with respect to earth, and means for connecting the main coil of the instrument in series with the source of E. M. F., between the frame of the apparatus and the neutral conductor of the supply system.

6. In electric apparatus energized from a supply system with an earthed neutral conductor and having its frame or other metal-clad portion provided with a direct earth connection, the combination of a source of E. M. F., a measuring instrument having main and auxiliary operating coils, two adjustable resistances, means for connecting the auxiliary coil in series with one adjustable resistance between the apparatus frame and the neutral conductor of the supply system whereby the resistance can be adjusted in accordance with the potential of the neutral conductor and also connecting the main coil in series with the other adjustable resistance to the source of E. M. F. whereby this resistance can be adjusted to compensate for variations in the E. M. F. of the source, and means for connecting the main coil, the source of E. M. F., and one of the adjustable resistances in series between the frame of the apparatus and the neutral conductor of the supply system.

7. Electric apparatus according to claim 6 provided with a common operating member for the two adjustable resistances.

8. In electric apparatus energized from a supply system with an earthed neutral conductor and having its frame or other metal-clad portion provided with a direct earth connection, the combination of a transformer having primary and secondary windings, means for connecting the primary winding of the transformer to the supply system, a measuring instrument having its operating circuit connected in series with the transformer secondary winding, means for connecting this series circuit between the frame of the apparatus and the neutral conductor of the supply system, and calibrating means associated with the measuring instrument whereby a measurement substantially independent of any difference of potential between the neutral conductor and earth can be obtained.

9. In electric apparatus energized from a supply system with an earthed neutral conductor and having its frame or other metal-clad portion provided with a direct earth connection, the combination of means for connecting the primary winding of the transformer to the supply system, a measuring instrument having its operating circuit connected in series with the transformer secondary winding, means for calibrating this series circuit in accordance with variations in the supply voltage, and in accordance with any difference of potential between the neutral conductor and earth, and means for connecting the said series circuit between the frame of the apparatus and the neutral conductor of the supply system.

10. A portable equipment for testing the earth circuits of electric apparatus energized from a supply system having an earthed neutral conductor which is earthed, comprising the combination of a casing, a transformer in the casing having primary and secondary windings, means for connecting the primary winding of the transformer to the supply system and one side of the secondary winding to the neutral conductor, a measuring instrument in the casing having one side connected to the other side of the transformer secondary winding, means for connecting the other side of the measuring instrument to the earth circuit of the apparatus to be tested, and calibrating means within the casing and associated with the measuring instrument whereby a measurement substantially independent of any difference of potential between the neutral conductor and earth is obtained.

11. An equipment for testing the earth circuits of electric apparatus energized from a supply system having an earthed neutral conductor, comprising the combination of a transformer having primary and secondary windings, means for connecting the primary winding of the transformer to the supply system and one side of the secondary winding to the neutral conductor, a measuring instrument having main and auxiliary coils, a connection from the other side of the transformer secondary winding to one side of the main coil, means for connecting the other side of the main coil to the earth circuit of the apparatus to be tested, and calibrating means comprising an adjustable resistance connected in series with the auxiliary coil of the instrument, and means for connecting this series circuit between the earth circuit of the apparatus and the neutral conductor of the supply system.

12. An equipment for testing the earth circuits of electric apparatus energized from a supply system having an earthed neutral conductor, comprising the combination of a transformer having primary and secondary windings, means for connecting the primary winding of the transformer to the supply system and one side of the secondary winding to the neutral conductor, a measuring instrument having main and auxiliary coils, two adjustable resistances, means for connecting the main coil of the instrument in series with an adjustable resistance to the secondary winding of the transformer for calibration, means for connecting the main coil of the instrument in series with an adjustable resistance between the secondary winding of the transformer and the earth circuit to be tested, and means for connecting the auxiliary coil of the instrument in series with one of the adjustable resistances between the earth circuit to be tested and the neutral conductor of the supply system simultaneously with the connection of the main coil and the other adjustable resistance to the secondary winding of the transformer.

13. A portable equipment for testing the earth circuits of electric apparatus energized from a supply system having an earthed neutral conductor, comprising the combination of a transformer having primary and secondary windings, means for connecting the primary winding of the transformer to the supply system and one side of the secondary winding to the neutral conductor, an ammeter in the casing having main and auxiliary coils, an adjustable resistance connected between the other side of the transformer secondary winding and one side of the main coil of the ammeter, a flexible conductor for making connection to the earth circuit to be tested, a switch for connecting the other side of the main coil either to the transformer secondary winding for calibration or to the flexible conductor, a second adjustable resistance connected between the neutral conductor and one side of the ammeter auxiliary winding, a second switch operated simultaneously with the first switch for connecting the other side of the auxiliary winding to the flexible conductor when the first switch is set for calibration, and a casing enclosing the said equipment.

14. A portable testing equipment as claimed in claim 13 including a scale for the ammeter calibrated in resistance units, a common actuating member for operating both resistances simultaneously and a scale for the actuating member calibrated in terms of a multiplying factor to be used to correct the test reading obtained so as to compensate for variations in the voltage of the supply system and in the potential between the neutral conductor and earth.

15. A portable testing equipment as claimed in claim 13 including flexible conductors for connecting the primary winding of the transformer between a conductor of the supply system and the neutral conductor and means for checking the polarity of this connection.

16. A portable equipment for testing the earth circuits of electric apparatus energized from an A. C. supply system having an earthed neutral conductor comprising, in combination, a casing, a D. C. generator within the casing, means for connecting one side of the generator to the neutral conductor, a flexible conductor for making connection to the earth circuit of the apparatus, and a measuring instrument in the casing connected between the other side of the generator and the flexible conductor, the arrangement being such that the measuring instrument is unaffected by A. C. of the supply frequency.

17. A portable testing equipment as claimed in claim 16 including an adjustable resistance connected between the instrument and the generator and means for connecting the other side of the instrument to the side of the generator connected to the neutral conductor whereby the resistance can be adjusted in accordance with the voltage of the generator.

HENRY LEYBURN.
CLEMETT HARRISON WRAGGE LACKEY.